(12) United States Patent
Danshchin et al.

(10) Patent No.: US 11,941,584 B2
(45) Date of Patent: Mar. 26, 2024

(54) RECOMMENDER SYSTEM FOR STAFF RECRUITMENT USING MACHINE LEARNING WITH MULTIVARIATE DATA DIMENSION REDUCTION AND STAFF RECRUITMENT METHOD USING MACHINE LEARNING WITH MULTIVARIATE DATA DIMENSION REDUCTION

(71) Applicant: OBSHCHESTVO S OGRANICHENNOI OTVETSTVENNOSTIU "HEADHUNTER", Moscow (RU)

(72) Inventors: Georgiy Andreevich Danshchin, Moscow (RU); Viktor Viktorovich Reushkin, Krasnogorsk (RU); Aleksandr Alekseevich Sidorov, Moscow (RU)

(73) Assignee: OOO "HEADHUNTER", Moscow (RU)

(*) Notice: Subject to any disclaimer, the term of this patent is extended or adjusted under 35 U.S.C. 154(b) by 0 days.

(21) Appl. No.: 17/439,982

(22) PCT Filed: Mar. 17, 2020

(86) PCT No.: PCT/RU2020/050048
§ 371 (c)(1),
(2) Date: Sep. 16, 2021

(87) PCT Pub. No.: WO2020/190176
PCT Pub. Date: Sep. 24, 2020

(65) Prior Publication Data
US 2022/0172173 A1 Jun. 2, 2022

(30) Foreign Application Priority Data
Mar. 18, 2019 (RU) .................. 2019107661

(51) Int. Cl.
*G06F 16/93* (2019.01)
*G06F 16/9535* (2019.01)
*G06Q 10/1053* (2023.01)

(52) U.S. Cl.
CPC ......... *G06Q 10/1053* (2013.01); *G06F 16/93* (2019.01); *G06F 16/9535* (2019.01)

(58) Field of Classification Search
CPC .. G06F 16/93; G06F 16/9535; G06F 16/9536; G06F 16/9538
See application file for complete search history.

(56) References Cited

U.S. PATENT DOCUMENTS

2010/0030578 A1* 2/2010 Siddique ............... H04W 4/00
705/26.1
2013/0273968 A1* 10/2013 Rhoads ............... H04M 1/0264
455/566

(Continued)

*Primary Examiner* — Merilyn P Nguyen
(74) *Attorney, Agent, or Firm* — Bardmesser Law Group

(57) ABSTRACT

The provided invention relates to search engines and may be used to search for vacancies and resumes in databases. Further, the invention may be used to sort out vacancies and resumes by professional area and other predetermined similarity criteria. The technical result is to reduce labor costs for the preparation of materials required for machine learning, reduce the amount of machine computing, accelerate the receipt of results, and reduce the time for analyzing search results. To achieve the technical result, the recommender system uses learning and working databases, wherein the learning sequences are formed by sorting and processing the learning database matrices based on user feedback with regard to the degree of correspondence of the results presented to them to the query subject.

11 Claims, 1 Drawing Sheet

(56) References Cited

U.S. PATENT DOCUMENTS

| | | |
|---|---|---|
| 2017/0032035 A1 | 2/2017 | Gao et al. |
| 2018/0173803 A1 | 6/2018 | Grover et al. |
| 2019/0034793 A1 | 1/2019 | Kataria et al. |

* cited by examiner

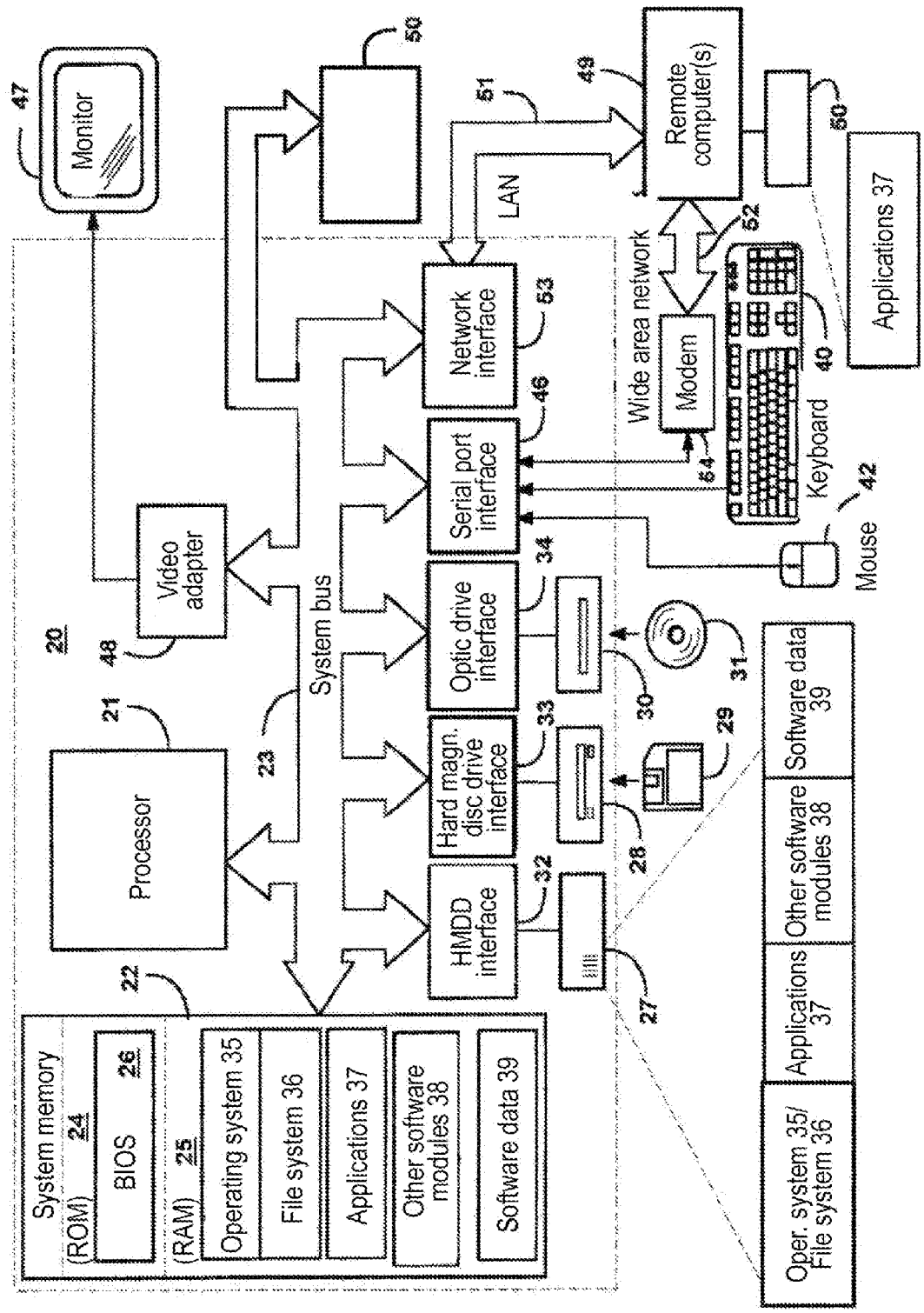

RECOMMENDER SYSTEM FOR STAFF RECRUITMENT USING MACHINE LEARNING WITH MULTIVARIATE DATA DIMENSION REDUCTION AND STAFF RECRUITMENT METHOD USING MACHINE LEARNING WITH MULTIVARIATE DATA DIMENSION REDUCTION

CROSS-REFERENCE TO RELATED APPLICATIONS

This application is a U.S. National Phase Application under 35 U.S.C. § 371, of International (PCT) Patent Application Serial No. PCT/RU2020/050048, filed on Mar. 17, 2020, which claims the benefit of priority to Russian Federation Patent Application Serial No. 2019107661 filed Mar. 18, 2019, the entire disclosure of each which are hereby incorporated herein by reference in their entirety for all purposes.

FIELD OF THE INVENTION

The present invention relates to search engines and may be used to search for vacancies and resumes in recruitment recommender systems with a large number of records in databases. Further, the system and method may be used to sort out vacancies and resumes by professional area and other pre-determined similarity criteria.

BACKGROUND

One of the problems in searching for resumes that match vacancies is the large number of documents brought up by search queries, which fact is due to job postings by already employed applicants who rather consider change of employment on acceptable terms then urgently seek a job. A large number of same-type results does not allow employers to make a decision on a candidate with minimal labor costs, and therefore there is a need for expert systems that reduce the labor costs of employers when choosing employees. The inverse problem is not a source of significant problems, since vacancies typically open when there is a need for an employee, and their number in the databases typically is one or two orders of magnitude less than the number of resumes.

One of the expert systems, which is closest to the subject invention, is the system disclosed in US patent application US2018173803 (A1) published on Jun. 21, 2018. The known solution uses machine learning to compress the resume/vacancy description vectors based on the semantic similarity of the vectors. The machine learning uses the determination of the coefficients of similarity of vectors between different areas, which fact implies a semantic analysis of data to be processed. The disadvantage of the known solution is the need for considering the semantics of search queries and indexed data, which fact implies the need for pre-sorting of data by industry. Due to the fact that some of the vacancies cannot be objectively attributed to certain industries, machine learning requires data processing by an operator. Thus, the efficiency of use of the known technical solution depends on the subjective qualities of the operator or operators who prepare the initial data for setting up the system; the search process is not fully formalized.

SUMMARY OF THE INVENTION

To achieve the technical result, provided is a method for the automated search of relevant documents for a recruitment recommender system using machine learning and reduction of dimension of multidimensional data, comprising the steps of: forming a document working database, each of the documents describing a resume or vacancy, wherein each document has a unique document identifier and comprises at least one indexed field comprising information characterizing the document using natural language terms, each of the indexed fields having a unique field identifier. updating the working database for documents by removing obsolete documents and adding new documents; forming a learning database for documents, comprising documents for which user feedback has been received, the feedback characterizing the relevance of documents to user search queries; updating the search database by adding documents for which documents new user feedback has been received on the compliance of documents with user queries; indexing, for each of the documents, the fields by transforming the information of the indexed field into an indexed table row, the individual cells of which correspond to one of the predetermined attributes corresponding to the position of the cell in the index table row, and the values entered in the cell correspond to the presence, in the information of the indexed field, of the natural language term corresponding to the cell; forming a learning index matrix, the rows of which are index rows corresponding to the documents of the learning database for documents; using a predetermined matrix compression procedure, compressing a lossy learning index matrix with dimensionality reduction to form a compressed index matrix; grouping the rows of the compressed index matrix according to predetermined formal features of similarity, wherein the documents corresponding to the grouped rows in a single group constitute a learning group of documents; and forming a decision system, for learning of which the index lines of documents of the corresponding learning group of documents are used as initial data, and user feedback for documents from the learning group is used as expected results; and forming, for the user's search expression, an index table row, wherein individual cells correspond to a predetermined attribute, and the values entered in the cell correspond to the presence of the corresponding attribute in the search expression; determining, for the index line of the search expression, at least one of the predetermined formal features of similarity corresponding to the search expression; preselecting documents from the working database, the index lines of which correspond to the features of similarity corresponding to the search expression, and presenting the documents to the user, the documents being selected by the decision system from documents preselected from the database.

In one of particular embodiments, the semantic structures of the natural language are normalized according to a predetermined algorithm, and the latent semantic indexing is performed using normalized structures.

In one of particular embodiments, the natural language structures are normalized by lemmatization.

In one of particular embodiments, the natural language structures are normalized by stemming.

In one of particular embodiments, one predetermined general term for several predetermined synonyms is used for normalizing.

In one of particular embodiments, a matrix rank reduction procedure using a singular value decomposition of the matrix is used as a predetermined matrix compression procedure.

In one of particular embodiments, a high-reliability data storage is used to store the learning document database.

In one of particular embodiments, the value of a locality-sensitive hash function is used as a predetermined similarity feature, and matrix terms are used as hash function arguments.

Technical Problem

The subject solution solves the problem of creating an automated expert recruitment system. The technical result achieved by way of the invention is to reduce labor costs for the preparation of materials required for machine learning, reduce the amount of machine computing, accelerate the receipt of results, and reduce the time for analyzing search results.

BRIEF DESCRIPTION OF DRAWINGS

FIG. 1 shows an example of a general-purpose computer system that may be used to create and configure individual elements of the system, such as data processing and storage servers and system modules.

DESCRIPTION OF EMBODIMENTS

By reference to exemplary embodiments, those skilled will appreciate the objects and attributes of the present invention, methods for achieving same. However, the present invention is not limited to the exemplary embodiments disclosed below, but may be embodied in various forms consistent with the spirit of the invention disclosed in the claims.

As used in the present description of the invention, the terms "component", "element", "system", "module", "part", in particular, "component portion", "unit" and the like are used to refer to computer entities (e.g., objects associated with a computer, computing entities), which may be hardware, in particular, equipment (for example, a device, tool, apparatus, hardware tools, portion of a device, in particular, a processor, microprocessor, printed circuit board, etc.), software (for example, executable program code, compiled application, software module, portion of software and/or code, etc.) or microcode software (firmware). For example, a component may be: a process running/being executed on a processor, processor, object, executable, program, function, method, library, subprogram, and/or computing device (e.g., microcomputer or computer), or combination of software or hardware. By way of illustration, both an application running on a server, in particular on a central server, and a server may be a component or module. At least one component may be present (disposed) inside a process. A component may be disposed on one computing device (e.g., a computer) and/or may be distributed between two or more computing devices. For example, in a particular case, an application (component) may be a server component (server part) and a client component (client part). In a particular case, the client component is installed on at least one computing device, and the server component is installed on the second computing device, from which, in a particular case, the first computing device (and/or its components/parts) is controlled and/or adjusted. In a particular case, a module (etc.) may be (be implemented as) one or a set of files, including an executable file (files), which, in turn, may be associated with at least one software library, for example, implemented as a dll file, which is a compiled form of the Dynamic Link Library, as well as at least with one file, for example, comprising application service data, application metadata, data necessary for application functioning, and/or a service (a local service and/or remote service, for example, a web service), including applications and services built on a service-oriented architecture/SOA, including but not limited to REST (Representational State Transfer) technology, remote procedure call (RPC) and others.

One of the prerequisites for the creation of the invention is the need for an expert system with machine learning, which minimally uses the operator intervention during machine learning and adjustment of the system.

Databases of the recommender system may be logically and physically divided into separate structures, in accordance with the purpose of the data stored in separate structures.

Various database management systems (DBMS) may be used to manage, create and use databases. In particular cases, to store documents and the document processing results provided below, persistent data storages may be used, and random access memory may be used to store the data required to process a single search query.

The subject invention provides hardware-software logical structures, which allow performing operations for generating recommendations as efficiently as possible. In the implementation of the invention, individual servers with one or more processors or a set of servers used for storing and processing data both separately and in a joint operation mode, for example, in the form of a cluster, may be used as hardware and software structures. In the system on which the invention is implemented, for the implementation of each of the units and modules provided below, one to several dozen servers are used, the servers united by data transmission channels. To implement some of the units, virtual servers and virtual machines were used, which are similar in functionality to individual hardware servers. In particular, the system uses a unit of distributed data storage, the unit providing data distribution and coordination of work on servers remote from each other.

The described invention provides the formation of a working database for documents, each of which describes a resume or vacancy, wherein each document has a unique identifier of a document and comprises at least one indexed field comprising information characterizing the document using natural language terms, each of the indexed fields having a unique field identifier.

A unique identifier of a resume or a vacancy may be used as an identifier of a document, wherein the identifier of a document attribute may contain an indication of the user who made the document. In a particular case, the identifier may comprise a user's e-mail address or mobile phone number or other unique identifier, as well as the sequential number of a resume or vacancy.

Each document included in the working database generally comprises a single field, but in particular cases it may comprise several fields, each of which comprises information at least partially suitable for determining the correspondence of the document to a search query. Within the scope of the invention, "field" refers to a collection of search attributes, at least some of which are considered in the processing of search queries, as described within the scope of the present invention. Each field further comprises a unique identifier, which may be defined by a document identifier and a field number within a document, or a field purpose. For example, it may be specified that the field is an "education" field or a "work experience" field.

The search queries described in the present invention may be either search strings generated in real time or documents themselves. In particular embodiments of the invention, the description of a resume or vacancy, in whole or in part, may be used as a set of data characterizing a search query. For example, to search for a resume, job description may be used as a search query, and vice versa.

Initially, users fill out electronic forms of resume templates, which, in general, have at least one field, which allows assigning a unique identifier to a resume or vacancy (ID, data name, identifier). Other data may be entered in an arbitrary or formalized form in one or more further fields. Other fields may be "work experience", "education", "personal qualities" etc. The fields with said names may be used both for the description of resumes and for the description of vacancies. In this regard, unless otherwise indicated, the system processes all data of resumes and vacancies jointly.

When processing search queries, those (or only those) descriptions of either resumes or vacancies, which correspond to the subject of a query, may be used. The query subject related to the search for resumes or search for vacancies may be explicitly indicated in the name or a dedicated subject description field, or may follow from a set of information included in the search expression.

Within the scope of the implementation of the present invention, the working database for documents (working document database) may be updated by removing obsolete documents and adding new documents. The working database may be updated on the basis of users direct instructions to delete and add vacancies and resumes to the database. Documents that have expired may also be deleted from the database.

Within the scope of the implementation of the present invention, a learning database for documents (learning document database) is formed, the database comprising documents for which user feedback has been received. User feedback defines the relevance of documents to user search queries. A highly reliable storage unit is used to store the learning database, as lost information related to documents deleted from the working database cannot be recovered. The highly reliable data storage unit provides fault-tolerant storage of the most important data in a relational structure, maintaining integrity and instant access to data. It is preferable to use a highly reliable data storage unit for storing documents in their original format, for example, in natural language representation.

The system implementing the present invention may include a storage unit for processed data and a storage unit for data being processed. The processed data is divided into categories and distributed for storage in accordance with the required storage reliability category. The main requirement for the processed data storage module is data storage reliability and availability for local services. To this end, distributed storage may be used in accordance with the "location" attribute corresponding to the location of a vacancy or a desired job specified in the resume.

Also, the system may use an interface module that makes it possible for end users and staff members who provide maintenance of the system (operators) to interact with the system using end access devices, using web browsers, mobile applications and other third-party systems used for data exchange, for visualization of the results of data exchange and for the maintenance of the information input device.

A module for generating predictions in the search box may further be used, which is used if the search expression for the search box is formed in real time, as well as a module for correcting typos may be used, which may be used both in the process of data input by the user and for preprocessing documents before normalization of document texts and indexing.

The search database is updated by adding documents to the database, for which documents new user feedback has been received in regard to the correspondence of documents to user queries. Documents from the learning database are typically not deleted, but may be deleted, for example, after a profession is no longer necessary on the job market.

To learn the subject system and further to facilitate the following search, the fields of the documents in the database are indexed by transforming the information of the indexed field into an index table row. Each of the cells of the index table row corresponds to the presence or absence in the indexed field of a predetermined attribute used for indexing. That is, all the attributes used for indexing are distributed between cell numbers, and the values entered in the cells of the table rows correspond to the presence of attributes, for example, natural language terms used for indexing. In a particular case, the information of the indexed field may be transformed into an index table row using latent semantic indexing, and the selection of documents relevant to the search expression and the formation of a list ordered according to relevance when performing a search may be carried out using latent semantic analysis.

The attributes are formalized and normalized, for example, by latent semantic indexing, which results in the formation, for each field, of an index expression represented as a string.

In a particular case, the semantic structures of the natural language are normalized according to a predetermined algorithm, and the latent semantic indexing is performed using normalized structures.

For sets of vacancies and resumes or for the entire set of data, an initial data matrix is formed, each of the rows of the matrix being a vacancy field or a resume field. In a particular case, separate matrices are formed for resumes and vacancies. In another particular case, fields have predefined attributes, and matrices are formed for fields with common attributes. For example, fields related to educational institutions where a candidate was educated, and a region where a job may be provided are processed separately. Based on the essence of the following operations, to reduce the amount of calculations, grouping of fields by properties is preferable to processing matrices. In a particular case, matrices of geographic locations of jobs are of low rank and may be used to provide query results without additional processing. For example, if a candidate specifies a geographic location in which the candidate can perform a job, other locations will not be considered. In this case, exact match determination is used, which does not require complex data processing. Similarly, the requirement of graduation from a particular educational institution may be checked.

Latent semantic analysis and latent semantic indexing may use the operations of forming and using decision trees, including the construction of decision tree systems using gradient boosting. Data processing methods described and used in the XGBoost software library may be applied to generate gradient boosting decision trees.

Prior to latent semantic indexing, typos and obvious errors may be corrected, for example, the typos and obvious errors being associated with autocorrected errors on the user's computer.

Effective models for ranking results, including latent semantic analysis, make it possible to achieve high quality search for relevant documents, but have significant limitations on the amount of data being processed. In particular, ranking costs increase in proportion to the squared number of records. In this regard, when implementing the invention, formal data processing procedures are used to reduce the number of simultaneously processed records during latent semantic analysis.

For the purposes of subsequent processing, the sets of field rows are represented in the form of a two-dimensional data array that is similar to a matrix where rows are rows of fields having a unique identifier, and columns are formed by information related to the same attributes of the field rows. Hereinafter, in order to simplify understanding of the text of the description, two-dimensional data arrays will be referred to as "matrices".

In particular, in order to reduce the amount of data to be processed, at the first step, the ranks of the matrices used in the system when implementing the method are reduced. Reduction of the rank of matrices provides lossy data compression, but without significant damage to the results of a future search.

In a particular embodiment of the invention, the matrices are pre-assigned with a rank, to which the rank reduction is performed. The rank may be set empirically, for example, by checking the quality of a search prior to and following the matrix rank reduction. The rank of a reduced-rank matrix may be determined by the results of machine learning, for example, by determining the quality of searches after applying the singular value decomposition for various predetermined values of the rank of a reduced-rank matrix.

When using machine learning, a standard or custom loss function may be used, the value of which depends on both the number of errors and the severity of the errors.

In a particular embodiment of the invention, to reduce the rank, a matrix rank reduction technique is employed using singular value decomposition or "rank-k SVD".

According to the results of the rank reduction using singular value decomposition, the attribute values in the fields change. Furthermore, if the initial values were equal to zeros and ones, then following the rank reduction, the attribute values may become arbitrary and expressed by rational numbers. In this regard, the task of latent-semantic analysis for identifying the fields corresponding to the query becomes significantly more complicated. Despite a significant reduction in the amount of data being processed, the search process is not simplified due to the transition from discrete values to continuous ones.

Initially, attributes or terms have two discrete values. The rank reduction function may include a discreteness degree up to a continuous function, which fact also substantially improves the results of the LSH calculation to follow.

In another particular case, the singular value decomposition results are rounded while maintaining the discreteness of the attribute values, until the values "0" and "1" are saved.

Further, columns in which the same value is recorded in all fields, or columns that do not substantially affect search results are removed from the reduced-rank matrix. The columns that may be removed by reducing the rank may further be determined using the matrix rank reduction technique using singular value decomposition. As a result, a reduced-dimension matrix or reduced-dimension matrices are formed. Furthermore, similar fields, the attribute rows of which are assumed to be identical to each other, may be consolidated. In such matrices, each of the sets of identical rows is represented by one row, in relation to which the initial rows transformed into corresponding identical rows are brought into correspondence.

At the next step, for the fields characterizing a reduced-rank matrix, the fields are grouped by the values of the coordinates of the vectors, which are the vector sum of the values of the vectors of individual attributes. In order to simplify the description to follow, the vector sum of the values of the vectors of individual attributes will be denoted by the "field vector".

The grouping of fields is carried out by calculating the hash of the multidimensional coordinate of the field vector such that the vectors nearest to each other have an identical hash. In a particular case, fields using the locality-sensitive hashing (LSH) may be used, which is a probabilistic method for reducing the dimension of multidimensional data, wherein the main principle of the method is to provide such a selection of hash functions for some dimensions that similar objects with a high degree of probability have the same hash.

The length of the hash function may be predetermined, for example, after calculating the hash values for the rows of the reduced-dimension matrix and verifying that the hash model used is adequately applied to the reduced-dimension matrix. Preferably, the exhaustive set of hash values is $\frac{1}{100}$ to $\frac{1}{50}$ of the rank value of the reduced-rank matrix.

In a particular embodiment, the hash function may be set in a tabular form.

The MinHash, SimHash algorithms, random projections method may further be used to calculate LSH.

Reducing the dimension of the matrix of attributes reduces the amount of term (or attribute) data in documents so much that it becomes possible to store same in the index of search and grouping systems, quickly recall index data from memory and use them when forming groups and lists of recommendations. In addition, decreasing the matrix dimension improves the quality of filtering and ranking models, such as those used in the XGBoost library, compared to as if raw, sparse rows or attribute fields are used.

When determining LSH for matrix rows reduced using SVD, identical values of LSH hashes more accurately characterize the similarity of the source texts for fields, than if LSH hashes were calculated using non-reduced term vectors. Thus, sequential grouping of attributes first using SVD and then using LSH gives higher relevance of the results of grouping similar fields. Transforming data in reverse order, that is, first applying LSH and then applying SVD, increases the computational complexity and reduces the relevance of the results. In particular, hashing of sparse data does not provide an accurate determination of rows that are relevant to each other, and the matrix rank and dimension reduction for the computed hashes further reduces the relevance of the transformations.

Thus, after calculating the LSH hash values and grouping the document fields by hash values, learning sequences are formed, each of which is characterized by one of location-sensitive hash values. If necessary, for example, in case of a small number of fields in a single group, the initially determined groups may be combined.

The user reaction to search engine results provided is used as learning data for each of the fields. To conduct machine learning, the user is requested to provide a real degree of correspondence of the list item with the query. In various particular embodiments of the invention, the assessment may be given by the user directly, for example, on a correspondence gradation scale. In another particular embodiment, the degree of correspondence is determined indirectly, for example, for a resume, the degree of correspondence increases from the user ignoring the link to the resume shown to the employment of the candidate who posted a resume, with intermediate gradations of "resume seen" and "candidate has been invited for an interview". Thus, to form learning data, user actions are tracked, the actions consisting in viewing resumes or vacancies and applying or inviting. Further, it is advisable to consider applications and invitations as unequal events.

When training a search engine, each training group or sample may form its own decision tree or several gradient boosting decision trees. The formed trees may be jointly used when searching for a vacancy, even when analyzing a vacancy group that is not associated with a vacancy group corresponding to the training set.

The fields of the working database are also converted into a matrix or table view followed by compression of the matrix and grouping of the fields of the compressed matrix according to formal similarity.

When the user forms a search query, that is, a description of the desired vacancy or resume, the user may fill in the fields intended for the query, or a vacancy (resume) description may be used as a search expression.

For a search expression, one or more LSH hash values that are relevant to the search expression are initially determined, and then fields that are relevant to the search expression are determined.

For example, for a search expression, the fields are processed using a matrix compression algorithm and a location-sensitive hash function is computed, which makes it possible to identify groups of fields from the working database that are similar to the search expression.

Further, the information intended to be searched may exclude documents that a priori do not correspond to the search objectives, for example, resumes of applicants who do not have higher education, who are not ready to relocate, and others may be excluded from the search.

Next, to perform an accurate search and sort the identified data, index strings are used, the index strings corresponding to fields similar to the search expression. The search expression is further indexed using latent semantic indexing. To carry out the search, a latent-semantic analysis of the fields of the search expression and fields from the working database is used.

Latent semantic analysis method determines the fields that are most relevant to the search expression. In a particular embodiment of the invention, the list of relevant documents is sorted according to the degree of relevance and provided to the user for use.

Based on the results of processing the recommendations presented to the user, the learning database used in the system is updated and refined.

FIG. 1 shows an example of a general-purpose computer system that includes a multipurpose computing device in the form of a computer 20 or a server, or a mobile (computing) device, or a module of the system disclosed in the present invention, which, in particular, may be terminal (computing) devices (e.g., of a user, operator, etc.) including a processor 21, a system memory 22, and a system bus 23 that connects various system components, including the system memory, to the processor 21.

The system bus 23 may be any of various types of bus structures including a memory bus or memory controller, a peripheral bus, and a local bus using any of a plurality of bus architectures. The system memory 22 includes a read only memory (ROM) 24 and a random access memory (RAM) 25. The ROM 24 stores a basic input/output system 26 (BIOS), which consists of basic subprograms that help exchange information between elements within the computer 20, for example, at booting.

The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disc 31 such as a compact disc, digital video disc, and other optical media. The hard disk drive 27, the magnetic disk drive 28, and the optical disk drive 30 are connected to the system bus 23 via a hard disk drive interface 32, a magnetic disk drive interface 33, and an optical drive interface 34, respectively. The storage devices and their corresponding computer-readable means provide non-volatile storage of computer-readable instructions, data structures, program modules, and other data for the computer 20.

Although the typical configuration described herein uses the hard disk, the removable magnetic disk 29, and the removable optical disk 31, one skilled in the art will appreciate that other types of computer readable media may also be used in a typical operating environment that can store data that is accessible by a computer, such as magnetic cassettes, flash memory cards, digital video discs, Bernoulli cartridges, random access memory (RAM), read only memory (ROM), and the like.

Various software modules, including the operating system 35, can be stored on the hard disk, magnetic disk 29, optical disk 31, ROM 24, or RAM 25. The computer 20 includes a file system 36 associated with or included into an operating system 35, one or more software application(s) 37, other program modules 38, and program data 39. The user may enter commands and information into the computer 20 using input devices such as a keyboard 40 and a pointing device 42. Other input devices (not shown) may include a microphone, joystick, gamepad, satellite dish, scanner, or any other.

These and other input devices are connected to the processor 21 typically through a serial port interface 46 that is connected to the system bus, but may be connected through other interfaces such as a parallel port, game port, or universal serial bus (USB). A monitor 47 or another type of display device is also connected to the system bus 23 via an interface such as a video adapter 48. In addition to the monitor 47, personal computers typically include other peripheral output devices (not shown) such as speakers and printers.

The computer 20 may operate in a networked environment through logical connections to one or more remote computers 49. The remote computer(s) 49 may be another computer, server, router, networked PC, peer-to-peer device, or other node on a single network, and typically includes most or all of the items described above in relation to the computer 20, although only an information storage device 50 is shown. Logical connections include a local area network (LAN) 51 and a wide area network (WAN) 52. Such networking environments are typically common in offices, corporate computer networks, and the Internet.

The computer 20 used in a LAN network environment is connected to a local network 51 via a network interface or adapter 53. The computer 20 used in a WAN network environment typically uses a modem 54 or other means to communicate with the wide area network 52, such as the Internet.

The modem 54, which may be an internal or external modem, is connected to the system bus 23 via a serial port interface 46. In a networked environment, program modules or portions thereof described with respect to the computer 20 may be stored on a remote storage device. It will be appreciated that the network connections shown are typical and other means may be used to establish communication links between computers.

In conclusion, it should be noted that the information given in the description are examples, which do not limit the scope of the present invention defined by the claims. One skilled in the art will appreciate that there may be other embodiments of the present invention consistent with the spirit and scope of the present invention.

What is claimed is:

1. A method for automated search for a recruitment system, comprising:
    forming a working database that includes documents, each document representing a resume or a vacancy, wherein each document has a unique identifier and includes at least one indexed field, the indexed field including natural language text information that describes the document, the indexed field having a unique field identifier;
    wherein updating of the document in the working database includes deleting an old version of the document and adding a new version of the document;
    forming a learning database that represents a subset of the working database and that includes only documents with user feedback in response to a user query, such that the feedback characterizes a relevance of the document to the user query;
    indexing the documents in the working database by transforming, into index tables, the natural language text information in all index fields of all the documents, each index table corresponding to one index field, each row in an index table corresponds to a document and each column in the index table corresponds to a natural language term from the corresponding index field, and a value in a cell represents a presence of the natural language term in that document;
    for each index field, forming a learning matrix, such that rows in the learning matrix correspond to documents in the learning database;
    for each index field, generating a lossy learning matrix from the learning matrix, wherein rows of the lossy learning matrix correspond to compressed rows of the learning matrix with rank reduction, wherein each cell of the lossy learning matrix has a value of 0 or 1, and wherein the lossy learning matrix is a sparse matrix,
    wherein each column in the lossy learning matrix is a feature of similarity;
    grouping rows of the lossy learning matrix according to features of similarity, wherein documents corresponding to the grouped rows in a single group constitute a learning group of documents for the user query;
    forming a decision system that, as input, uses the user query, and, as output, produces documents from the learning database that are relevant to the user query based on the user feedback, and wherein the learning group is used as an initial output of the decision system during training;
    expanding the lossy learning matrix to cover all the documents in the working database, thereby forming a lossy index matrix;
    in response to a runtime query from the user, forming a lossy vector from the runtime vector, the lossy vector representing a set of features of similarity;
    identifying a set of features of similarity in the lossy vector that are optimal for the runtime query;
    using the lossy index matrix, pre-selecting a set of documents from the working database that have the set of features of similarity; and
    from the pre-selected a set of documents, selecting most relevant documents using the trained decision system, and provide the most relevant documents to the user.

2. The method according to claim 1, wherein semantic structures of the natural language text information are normalized, and latent semantic indexing of the documents in the working database is performed using the normalized semantic structures.

3. The method according to claim 2, wherein the normalization of the semantic structures is performed by lemmatization.

4. The method according to claim 2, wherein the normalization of the semantic structures is performed by stemming.

5. The method according to claim 2, wherein one general term for several synonyms is used for the normalization of the semantic structures.

6. The method according to claim 1, wherein a matrix rank reduction procedure using a singular value decomposition of the matrix is used in the step of generating the lossy learning matrix.

7. The method according to claim 1, wherein a high-reliability data storage is used to store the learning database.

8. The method according to claim 1, wherein a value of a locality-sensitive hash function is used as the feature of similarity.

9. A recruitment recommender system, comprising:
    a processor coupled to a memory, the processor executing code stored in the memory, the processor being configured by the code to
    form a working database that includes documents, each document representing a resume or a vacancy,
    wherein each document has a unique identifier and includes at least one indexed field, the indexed field including natural language text information that describes the document, the indexed field having a unique field identifier;
    wherein updating of the document in the working database includes deleting an old version of the document and adding a new version of the document;
    form a learning database that represents a subset of the working database and that includes only documents with user feedback in response to a user query, such that the feedback characterizes a relevance of the document to the user query;
    index the documents in the working database by transforming, into index tables, the natural language text information in all index fields of all the documents, each index table corresponding to one index field, each row in an index table corresponds to a document and each column in the index table corresponds to a natural language term from the corresponding index field, and a value in a cell represents a presence of the natural language term in that document;
    for each index field, form a learning matrix, such that rows in the learning matrix correspond to documents in the learning database;
    for each index field, generate a lossy learning matrix from the learning matrix, wherein rows of the lossy learning matrix correspond to compressed rows of the learning matrix with rank reduction, wherein each cell of the lossy learning matrix has a value of 0 or 1, and wherein the lossy learning matrix is a sparse matrix,
    wherein each column in the lossy learning matrix is a feature of similarity;
    group rows of the lossy learning matrix according to features of similarity, wherein documents corresponding to the grouped rows in a single group constitute a learning group of documents for the user query;
    form a decision system that, as input, uses the user query, and, as output, produces documents from the learning database that are relevant to the user query based on the user feedback, and wherein the learning group is used as an initial output of the decision system during training;

expand the lossy learning matrix to cover all the documents in the working database, thereby forming a lossy index matrix;

in response to a runtime query from the user, form a lossy vector from the runtime vector, the lossy vector representing a set of features of similarity;

identify a set of features of similarity in the lossy vector that are optimal for the runtime query;

using the lossy index matrix, pre-select a set of documents from the working database that have the set of features of similarity; and from the pre-selected a set of documents, select most relevant documents using the trained decision system, and provide the most relevant documents to the user.

10. The recommender system according to claim 9, wherein semantic structures of the natural language text information are normalized, and latent semantic indexing is performed using the normalized semantic structures.

11. The recommender system according to claim 9, further comprising a high-reliability data storage for the learning database.

* * * * *